United States Patent
Arbuckle et al.

(10) Patent No.: US 9,970,373 B1
(45) Date of Patent: May 15, 2018

(54) METHOD AND SYSTEM FOR DETECTING AND ELIMINATING KNOCKING

(71) Applicant: Brunswick Corporation, Lake Forest, IL (US)

(72) Inventors: Jason S. Arbuckle, Horicon, WI (US); Matthew W. Snyder, Fond du Lac, WI (US); Thomas S. Kirchhoff, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days. days.

(21) Appl. No.: 15/355,462

(22) Filed: Nov. 18, 2016

(51) Int. Cl.
　*F02D 35/02* (2006.01)
　*F02D 41/14* (2006.01)
　*F02D 41/26* (2006.01)
　*G01L 23/22* (2006.01)
　*F02B 61/00* (2006.01)

(52) U.S. Cl.
　CPC ....... *F02D 41/1498* (2013.01); *F02D 35/027* (2013.01); *F02D 41/26* (2013.01); *G01L 23/221* (2013.01); *F02B 61/00* (2013.01); *F02D 2200/101* (2013.01)

(58) Field of Classification Search
　CPC .... F02D 41/1498; F02D 41/26; F02D 35/027; F02D 2200/101; G01L 23/221; F02B 61/00
　USPC .................. 123/435; 73/35.06; 701/110, 111
　See application file for complete search history.

(56) References Cited

U.S. PATENT DOCUMENTS

| | | | |
|---|---|---|---|
| 4,667,637 A | 5/1987 | Staerzl | |
| 4,761,992 A | 8/1988 | Staerzl | |
| 5,267,164 A | 11/1993 | Miyama | |
| 5,535,722 A | 7/1996 | Graessley et al. | |
| 5,537,855 A | 7/1996 | Hunninghaus et al. | |
| 6,012,425 A | 1/2000 | Unland et al. | |
| 6,145,491 A | 11/2000 | Wilstermann et al. | |
| 6,456,927 B1 | 9/2002 | Frankowski et al. | |
| 6,845,312 B1 | 1/2005 | Cross et al. | |
| 6,932,056 B1 | 8/2005 | Tartt | |
| 7,295,916 B2 | 11/2007 | Sauler et al. | |
| 2015/0159573 A1* | 6/2015 | Glugla ................ F02D 41/1498 701/103 |

FOREIGN PATENT DOCUMENTS

EP　　0454486　　10/1991

* cited by examiner

*Primary Examiner* — Hai Huynh
(74) *Attorney, Agent, or Firm* — Andrus Intellectual Property Law, LLP (57) ABSTRACT

A method of controlling an internal combustion engine of a marine propulsion device includes receiving a knock sensor signal over an analysis period in a combustion cycle of an internal combustion engine, and subdividing the analysis period into at least a first knock window and a second knock window. The method further includes determining that the knock sensor signal exceeds a threshold in each of the first knock window and the second knock window, and that the knock sensor signal intensity is greater in the first knock window than in the second knock window. At least one combustion parameter is then adjusted for the internal combustion engine to eliminate knocking.

20 Claims, 9 Drawing Sheets

METHOD AND SYSTEM FOR DETECTING AND ELIMINATING KNOCKING

FIELD

The present disclosure generally relates to a method for controlling an internal combustion engine in a marine propulsion device, and more specifically to a method and system for detecting knocking and controlling combustion perimeters to reduce the knocking.

BACKGROUND

The following U.S. Patents and Applications provide background information and are incorporated herein by reference in entirety.

U.S. Pat. No. 5,537,855 discloses a knock detection method and apparatus that integrates a knock sensor signal over a first period and provides a first integrated knock sensor signal, and integrates the knock sensor signal over a second period and provides a second integrated knock sensor signal. A knock indication is provided dependent on an amplitude of the first integrated knock sensor signal and an amplitude of the second integrated knock sensor signal and independent of the influence of the variations of the knock sensor potential sensor to sensor gain variation.

U.S. Pat. No. 6,845,312 discloses a method for processing knock-related data that reduces the memory locations required for the method and also simplify the processing steps needed to determine a sum, average, and threshold value relating to magnitudes of knock ratios. Inputs from either pressure sensor or accelerometers are filtered and then used to form a ratio between a knock portion of a curve and a reference portion. Sequential magnitudes of the knock ratio are received and analyzed in a manner that reduces required memory locations and improves processing speed.

U.S. Pat. No. 6,932,056 discloses a control method for controlling an internal combustion engine that selects a knock threshold magnitude and compares it to individual knock event magnitudes. The difference between these two values is calculated and limited to be within a predetermined range of values. This limitation selects either an event based control method, a proportional control method, or a control method with characteristics of both techniques. A gain is selected as a function of the algebraic sign of the limited or scaled value and the gain is multiplied by the calculated difference. The result is added to a cumulative value of previously calculated differences multiplied by associated gains. The cumulative value is used as a threshold that activates a plurality of control steps which can include ignition timing changes, fueling changes, or air intake magnitude changes.

U.S. Pat. No. 7,295,916 discloses a method and a device for detecting knocking, in which a measurement signal of a knock sensor is evaluated during combustion in a cylinder of a combustion engine to determine whether the combustion occurred with knocking. The measurement signal is subdivided into a plurality of windows, and in each window an examination is performed to determine whether the combustion occurred with knocking. For a final assessment of whether the combustion occurred with knocking, the events of windows are compared to each other.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of controlling an internal combustion engine of a marine propulsion device includes receiving a knock sensor signal over an analysis period in a combustion cycle of an internal combustion engine, and subdividing the analysis period into at least a first knock window and a second knock window. The method further includes determining that the knock sensor signal exceeds a threshold in each of the first knock window and the second knock window, and that the knock sensor signal intensity is greater in the first knock window than in the second knock window. At least one combustion parameter is then adjusted for the internal combustion engine to eliminate knocking.

One embodiment of a method for detecting knocking in a marine propulsion device includes receiving a knock sensor signal over an analysis period in a combustion cycle of an internal combustion engine, and subdividing the analysis into at least a first knock window and a second knock window. A first per-unit knock value is determined for the knock sensor signal in the first knock window, and a second per-unit knock value is determined for the knock sensor signal in the second knock window. Knocking is then detected based on a comparison between the first per-unit knock value and the second per-unit knock value, and at least one combustion parameter is adjusted for the internal combustion engine to eliminate the knocking.

One embodiment of a knock detection system for a marine propulsion device includes at least one knock sensor producing a knock sensor signal over an analysis period in a combustion cycle of an internal combustion engine. The system further includes a control module configured to receive the knock sensor signal and subdivide the analysis period into at least a first knock window and a second knock window. The control module is further configured to determine that the knock sensor signal exceeds a threshold in each of the first knock window and the second knock window, and to determine that knocking is occurring when the knock sensor signal intensity is greater in the first knock window than in the second knock window. The control module is further configured to adjust at least one combustion parameter for the internal combustion engine to eliminate the knocking.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

In an internal combustion engine, each cylinder provides a combustion chamber where a combustion cycle, or process, occurs. Normally, the combustion within a chamber is ignited by a spark from the spark plug. However, self-ignition can occur—referred to as knocking—where an uncontrolled combustion process spontaneously occurs at some location in the cylinder. Such spontaneous ignition causes unacceptably high pressures and/or temperatures to occur within the cylinders, which can damage the internal combustion engine by causing piston and valve pitting, and crankshaft and rod bearing degradation. Engine knock dramatically decreases the life of an internal combustion engine, and thus immediate detection of knocking and immediate remediation of the conditions causing the knock is highly desirable. The frequency of such spontaneous combustion, or knocking, depends on the operating state of the internal combustion engine, e.g. the engine speed and engine load. A knocking event in a particular cylinder typically is initiated at the high pressure point in the combustion cycle, and spreads through the chamber during the upward motion of the piston and corresponding expansion of the chamber.

As will be known to a person of ordinary skill in the art, knock sensors are typically provided on internal combustion engines to detect knocking. Conventional knock sensors are designed, for example, as structure-born sound sensors, such as Piezoelectric acceleration attached to the engine block or pressure sensors associated with each cylinder. The pressure peaks caused by the combustion cycle in the combustion chamber of each of the cylinders produce sound waves in the engine block, which are detected by the acceleration sensors. In addition, some conventional knock sensors detect a pressure signal from the combustion chamber, such as a pressure transducer associated with each cylinder.

Figure 1A:
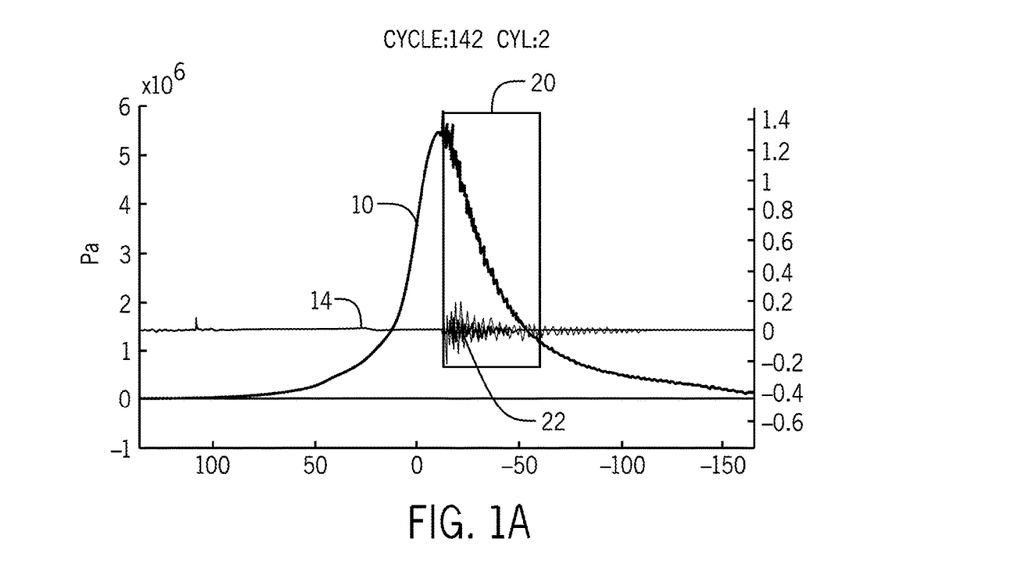
FIG. 1A is a graphical representation of a pressure wave and an accelerometer signal during a single knock event in one cylinder of an internal combustion engine.
Figure 1B:
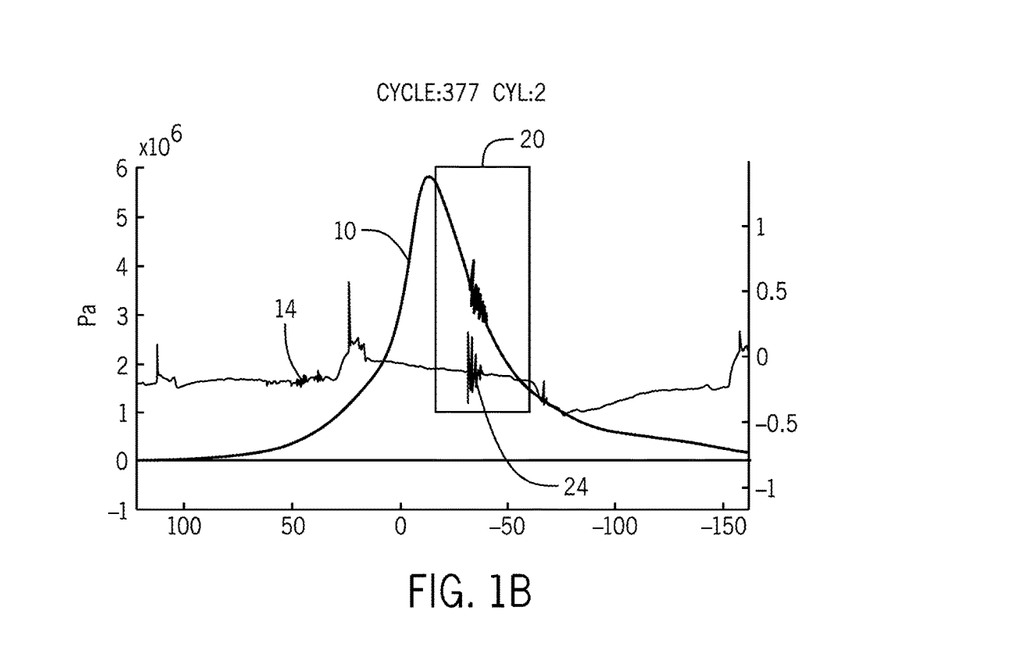
FIG. 1B is a graphical representation of a pressure wave and an accelerometer signal during a combustion event in one cylinder of an internal combustion engine where a knock does not occur.

FIG. 1 shows a graphical representation of a knock sensor signals over a combustion cycle of an internal combustion engine. Specifically, two knock sensor signals are presented, including a graphical representation of a pressure sensor signal 10 and an accelerometer signal 14. Various techniques are known to those skilled in the art for analyzing signals received from pressure sensors and from accelerometers for the purpose of detecting the occurrence of engine knocking.

Especially in the case of structure-born sound sensors, such as accelerometers, other events besides knocking may also result in structure-born pressure oscillations that are picked up by the sensors, thus introducing noise into the knock sensor signal. Such noise can be caused by any of a number of mechanical components that produce a structure-born sound signal in the engine block, such as intake and exhaust valves, timing chains, roller bearings, etc. Such noise typically occurs at known crank angles, but is not always present at all speeds and loads or on every combustion cycle. The problem is that noise can occur during the crank angles where knock typically occurs. Further, such noise often appears in frequencies where the knock signal is detected, which decreases the signal to noise ratio of the knock sensor signal. This can lead to either detecting a knock where no knocking has occurred (false positive), or not detecting a knock when knocking is actually occurring (false negative). Both scenarios should be avoided. False positives result in making unnecessary adjustment to the combustion parameters, which leads to lower horsepower and decreased fuel efficiency. False negatives lead to the allowance of knocking to persist, which often leads to engine damage described above.

Figure 2A:
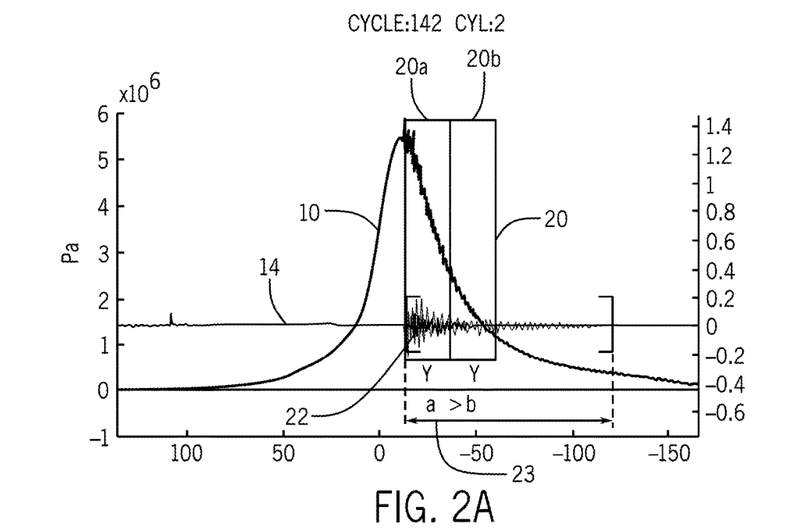
FIG. 2A depicts the graphical representation of FIG. 1, further depicting two analysis windows in accordance with one embodiment of the disclosure.
Figure 2B:
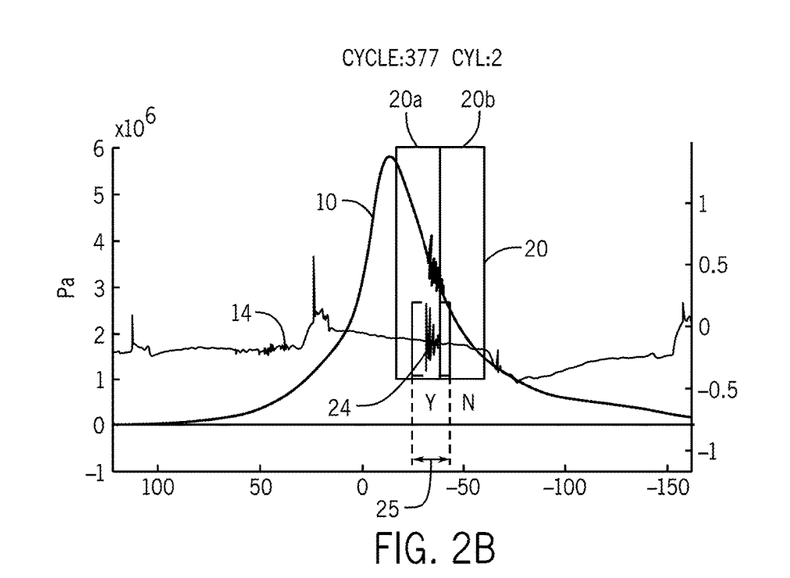
FIGS. 2B and 2C depict graphical representations of an accelerometer signal during a combustion event in one cylinder of an internal combustion engine where a knock does not occur, where two analysis windows are provided in accordance with one embodiment of the disclosure.
Figure 2C:
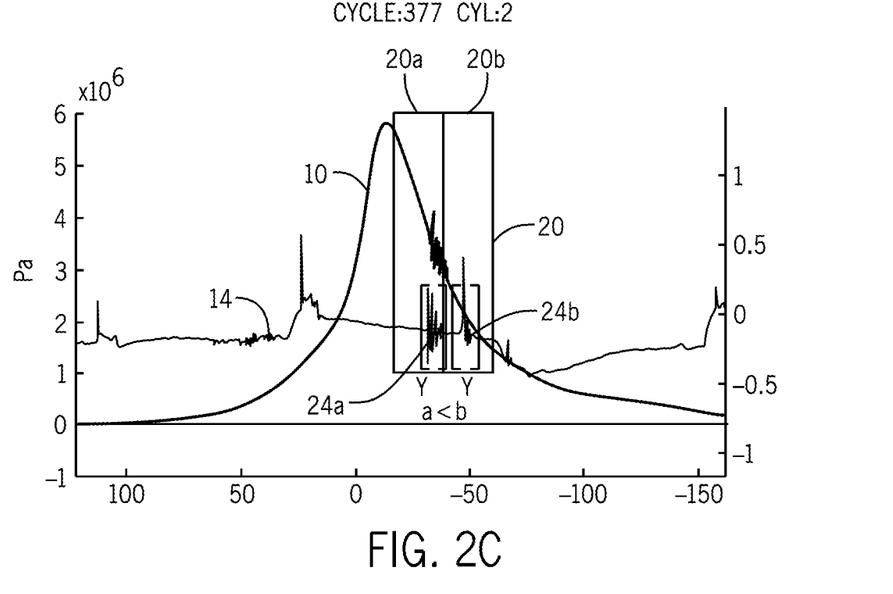

Accuracy in knock detection has been elusive, and a long existing need has persisted in the marine engine industry for systems and methods that accurately and precisely detect knock. Various techniques are known to those skilled in the art for analyzing signals from knock sensors, including from accelerometers and pressure sensors for the purpose of detecting the occurrence of knock. However, existing systems and methods continue to be inaccurate, providing false positives and/or false negatives. Referring to FIGS. 1 and 2, knock detection often involves examining the knock sensor signal during a time when the combustion process is occurring in each signal. An analysis period 20 is identified for each cylinder in a knock sensor signal. Multiple knock sensors may be providing knock sensor signals, and each cylinder is associated with a knock sensor signal, as will be known to a person having ordinary skill in the art.

FIGS. 1 and 2 provide comparisons between a combustion cycle where a knock occurs, FIGS. 1A and 2A, and a combustion cycle where no knock occurs but noise is present, FIGS. 1B and 2B-2C. Namely, FIG. 1A depicts one combustion cycle in cylinder 2 where a knock occurs, and FIG. 1B depicts another cycle in cylinder 2 where a knock does not occur but noise is present. The knock sensor signals depicted in FIGS. 1A and 1B, and throughout this disclosure, are shown with respect to crank angle. However, it will be understood by a person having ordinary skill in the art that such signals may also be analyzed and presented with respect to time.

FIGS. 1 and 2 highlight the problem of noise in knock detection systems, as noise can often have a signal power that is comparable to that of a knocking event and occur at a time when a knocking event can be expected. The axis for the pressure curve is presented on the left side of the graph and the axis for the accelerometer is provided on the right side of the graph. As can be seen by comparing the two graphs, the noise event 24 produces a higher amplitude in the knock sensor signal 10, 14, than in the knock sensor signal indicating a knock event 22. Thus, it can be difficult to differentiate one or more noise events 24 occurring during the analysis period 20 from an actual knock event 22 occurring during the analysis period 20.

Various techniques are known to those skilled in the art for analyzing and quantifying signals from knock sensors. For example, in some embodiments, the accelerometer signal may be rectified and integrated to derive a total energy magnitude that is representative of the accelerometer signal 14 during the analysis period 20. Certain prior art strategies have addressed noise issues by getting a baseline noise measurement that can be subtracted from the measurement signal—such as by measuring noise in a reference window prior to the time period where a knock event could occur (e.g., before top dead center (BTDC)), and comparing the reference signal to the knock sensor signal during the analysis period 20 in order to differentiate the actual knock signal from the noise picked up in the reference window. One example of such as method is provided at U.S. Pat. No. 6,932,056, which has been incorporated herein. The present inventors have recognized that such prior art systems and methods are prone to error because the reference window often does not include the same noise that occurs during the analysis period 20. For example, the noise event 24 in the knocking sensor signal 10, 14 shown in FIG. 1B would not be picked up by a reference window, and thus would not be removed from the knocking sensor signal analyzed during the analysis period 20.

In view of the foregoing problems and shortcomings of currently available knock detection systems and methods recognized by the inventors, the disclosed systems and methods were developed that subdivide the analysis period 20 into two or more knock windows, and the knock sensor signal is separately analyzed within each knock window to determine whether knocking is occurring. Referring to FIGS. 2A-2C, the analysis period 20 is subdivided into two or more sub periods, or windows, which include at least a first knock window 20a and a second knock window 20b. The knock sensor signal is then separately analyzed in each of the first knock window and the second knock window to determine whether a knock event occurs. This analysis strategy stems from the inventors recognition that a knock event 22 occurs over a longer period of time than a noise event 24.

The division of the analysis period 20 into multiple knock windows 20a, 20b that are separately analyzed arose from the inventors' recognition that a knock event 22 is a relatively long-duration event compared to a noise event 24. As shown in FIG. 2A, a knock event period 23 often extends for the full duration of the analysis period 20, or even longer. By comparison, most noise events 24 are relatively short in duration, as exemplified by the noise event 24 in FIG. 2B having a noise event period 25 that occupies only a portion of the analysis period 20. Accordingly, the inventors recognized that a true knock event 22 should be detectable in a majority, if not all, knock windows 20a, 20b, whereas a noise event 24 is likely to only be detected in one or a few knock windows 20a, 20b, depending on the number and duration of the knock windows in the analysis period 20.

Accordingly, the knock sensor signal 10, 14 is analyzed in each of the first knock window 20a and the second knock window 20b to determine whether the signal intensity exceeds a relevant threshold for each knock window that would indicate the occurrence of knocking. For example, the signal power, or integrated knock sensor signal, of the knock sensor signal 10, 14 in the first knock window 20a may be determined and compared to a threshold set for the first knock window. Likewise, the signal power in the second knock window 20b is determined and compared to a threshold for the second knock window. The thresholds to which the knock sensor signal in each window are compared may be different for each knock window, and in particular may differ in their magnitude. For example, the threshold for determining the presence of a knock may be larger in knock windows appearing earlier in the analysis period 20 (such as in the first knock window 20a), than for those knock windows appearing later in the analysis period 20 (such as in the second knock window 20b). This is because the knock sensor signal 10, 14 recording a knock event 22 is expected to have a higher signal power in the first half of the analysis period 20 than in the second half. Further, the duration of each of the knock windows (e.g., 20a and 20b) may differ from one another, and the threshold may be dependent on the duration of the relevant knock window 20a, 20b as the integrated signal over a shorter analysis period will be less than over a longer period.

Where a knock event 22 has occurred, the knock sensor signal 10, 14 is expected exceed the relevant threshold in each knock window, especially where the analysis period is divided into only two or three knock windows. Thus, in FIG. 2A, the relevant threshold is exceeded in both the first knock window 20a and the second knock window 20b (indicated in the figures by "Y" for "yes exceeded" and "N" for "not exceeded"). However, a noise event 24 will likely only occur in one or a subset of the knock windows, and thus will only cause the threshold to be exceeded in one or a subset of the knock windows. As exemplified in 2B, the threshold is exceeded in the first knock window 20a where the noise event 24 occurs, but is not exceeded in the second knock window 20b. Accordingly, no knock event would be detected.

However, the inventors further recognized that false positives could still occur where multiple noise events are present and occur in multiple or a majority of the knock windows. This is especially true since the intensity of a knock signal, and thus the relevant threshold, will be lower in the knock windows toward the end of the analysis period 20. An example is provided in FIG. 2C where two noise events 24a and 24b are present in the knock sensor signal 10, 14. In that situation, the threshold may be exceeded in both the first knock window 20a and the second knock window 20b.

In view of this problem of false positives recognized by the inventors, the disclosed system and method includes an additional step where the intensity measure, such as the integrated signal value, of the knock sensor signal in later knock windows is compared to that of earlier knock windows to assess whether the relationship corresponds to a knock event 22. As described above, the typical knock event 22 is marked by the occurrence of a strong signal in the first half of the analysis period 20 that tapers off in the second half. Thus, the intensity of the knock sensor signal in the first knock window 20a should exceed that in the second knock window 20b. With respect to the accelerometer signal 14, for example, this can be determined by comparing the first knock window integrator $A_{int}$ to the second knock window integrator $B_{int}$.

Alternatively, the knock sensor signal 10, 14 in each of the knock windows 20a, 20b could be compared based on its deviation from an average knock sensor signal, which can be assumed to represent a signal from a combustion cycle where no knock occurs. For example, a long running average may be maintained of the rectified and integrated accelerometer signal 14 for each knock window 20a, 20b. Likewise, the average may be first order filtered value, or an exponentially weighted long running average. The knock window integrator $A_{int}$ for the first knock window 20a can then be compared to the average knock window integrator $A_{int\_ave}$ for that window, and the knock window integrator $B_{int}$ for the first knock window 20a can then be compared to the average knock window integrator $B_{int\_ave}$ for that window. For example, the comparison can be a difference between the two values or a ratio of the values. For example, a knock ratio may be calculated for each knock window 20a, 20b as the knock window integrator calculated based on the accelerometer signal 14 in a knock window 20a, 20b divided by the running average for that particular knock window 20a, 20b. The knock ratios for each of the knock windows 20a, 20b can then be compared to one another to determine whether the pattern is consistent with a knock event. For example, the following relationship of knock ratios may be required to determine that knocking is occurring:

$$\frac{A_{int}}{A_{int\_ave}} > \frac{B_{int}}{B_{int\_ave}}$$

Referring again to FIG. 2C, the knock ratio for knock window 20b would exceed the knock ratio for the first knock window 20a, and thus the above-described relationship would not be found and no knock would be detected. By comparison, where a knock is present the knock ratio for knock window 20a will be larger than the knock ratio for the knock window 20b.

Figure 3A:
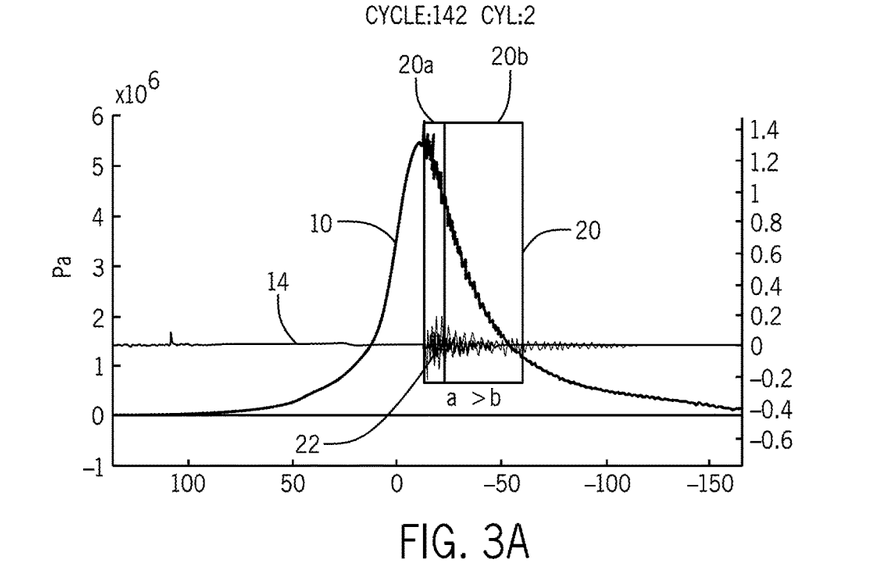
FIG. 3A depicts the graphical representation of FIG. 1, further depicting two analysis windows in accordance with another embodiment of the disclosure.
Figure 3B:
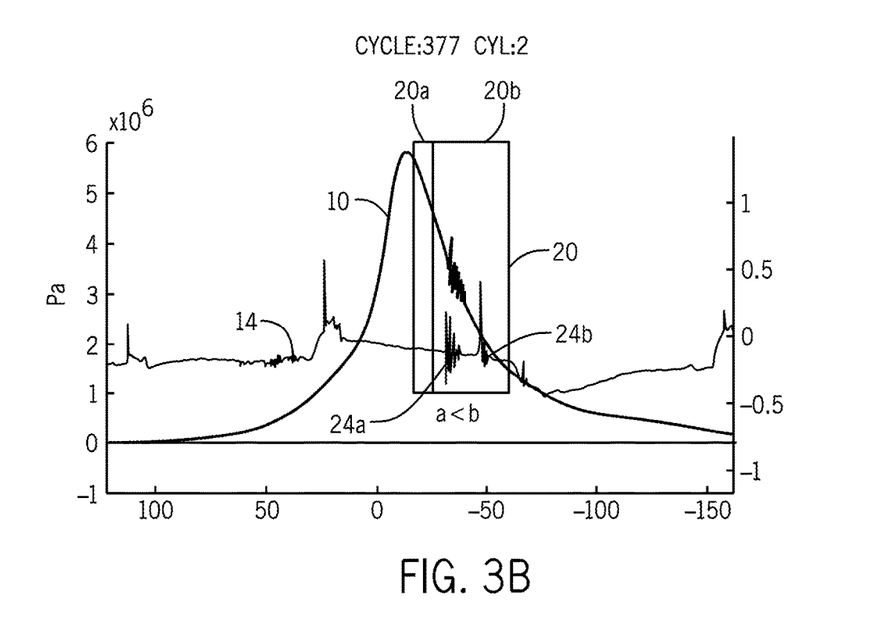
FIG. 3B depicts a graphical representation of an accelerometer signal during a combustion event in one cylinder of an internal combustion engine where a knock does not occur, where two analysis windows are provided in accordance with another embodiment of the disclosure.

To further alleviate the problem of knock detection errors, either false positives or false negatives, the inventors have recognized that the duration and/or number of knock windows can be adjusted. For example, known noise events 24 may occur at certain times or crank angles at given engine speeds and/or engine loads. Accordingly, the inventors have recognized that the duration of the knock windows can be adjusted based on engine speed and/or engine load to optimize knock detection. For example, where knock events occur at known crank angles or times, the window lengths can be adjusted so that noise is concentrated in a designated window and/or avoided in particular windows. FIGS. 3A and 3B provide an explanatory example. In the example, the duration of the first knock window 20a is significantly less than the duration of the second knock window 20b. This may be especially useful to lessen the impact of noise events that occur consistently in the combustion cycle, where the noise events can be concentrated in the second knock window 20b and avoided in the first window. Accordingly, in FIG. 3A where a knock event 22 has occurred, the knock ratio for knock window 20a will be greater than for 20b. Thus, all the requirements for knock detection are met and a knock is detected. In FIG. 3B where no knock has occurred and all of the noise events 24a and 24b present in the second knock window 20b, the knock ratio for the second knock window 20b will be larger than that of the first knock window 20a. Thus, no knock will be detected for the example of FIG. 3B.

In another embodiment, a per-unit knock value may be determined for each knock window 20a, 20b. This is especially useful in embodiments, such as that of FIGS. 3A and 3B where the knock windows are of different durations. The per-unit knock value allows fair comparison of signal intensity between the windows. In the depicted embodiment where the analysis period 20 is determined by crank angle, the per-unit knock value could be, for example, a per-crank-angle-degree value of the knock sensor signal 10, 14. In an embodiment where the analysis period 20 is determined based on time, the per-unit knock value can be a per-unit-time value. For example, the knock window integrator value for each knock window 20a and 20b can be divided by the crank angle duration or time duration of the respective knock window 20a, 20b. Alternatively, a root mean square (RMS) value could be determined for each knock window 20a, 20b. In other words, the per-unit knock value can be calculated as the integral of the squares of the instantaneous measured values during the respective knock window 20a, 20b. The per-unit knock values for each knock window 20a, 20b can then be compared to one another as described above to determine whether the appropriate relationship exists indicating that a knock event has occurred.

Similarly, the relevant threshold analysis can be performed for each knock window 20a, 20b based on the knock ratios and/or the per-unit knock values for the respective windows. The thresholds are set according to the relevant value to be used and the period and location of the respective knock window 20a, 20b, which may be a knock ratio threshold or a per-unit knock threshold for each knock window 20a, 20b. For example, the knock windows and relevant thresholds may be identified in a lookup table based on engine speed and engine load. Accordingly, the number of knock windows, duration of each knock window, and relevant threshold for each relevant knock window can be calibrated and accessible based on one or both of engine speed and engine load. Thereby, noise that consistently occurs at given locations in a combustion cycle for particular engine speeds and/or engine loads can be accounted for by varying the knock window and threshold values as described herein.

Figure 4A:
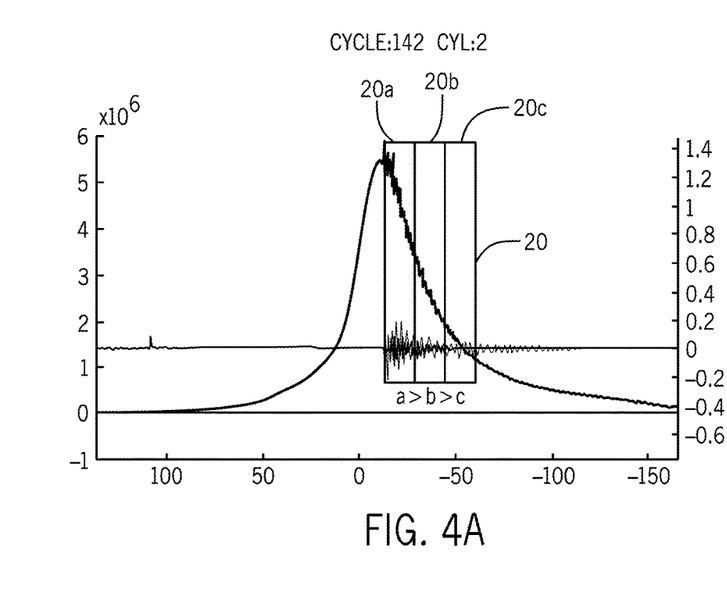
FIG. 4A depicts the graphical representation of FIG. 1, further depicting three analysis windows in accordance with another embodiment of the disclosure.
Figure 4B:
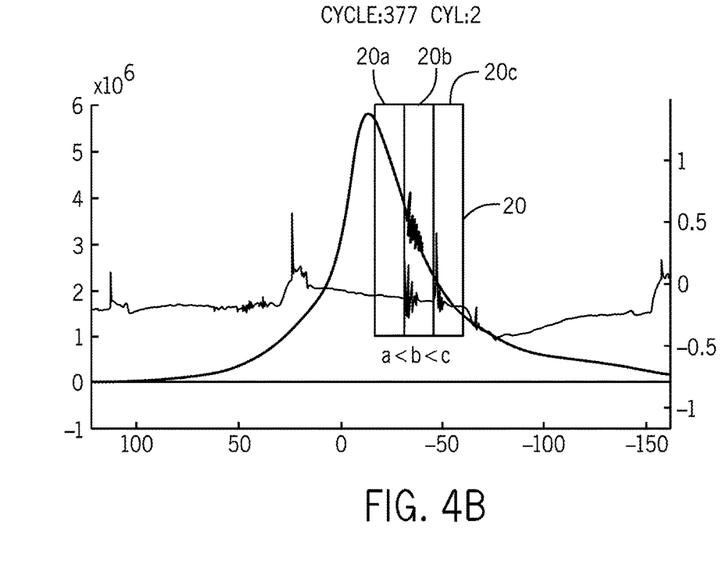
FIG. 4B depicts a graphical representation of an accelerometer signal during a combustion event in one cylinder of an internal combustion engine where a knock does not occur, where three analysis windows are provided in accordance with another embodiment of the disclosure.

While the examples of FIGS. 1-3 utilize two knock windows 20a and 20b, it should be understood that any number of two or more knock windows may be defined within the analysis period 20. Depending on the knock window configuration, analysis can be performed to determine whether the signal intensity decreases in subsequent knock windows within the analysis period 20 indicating a knock event. FIGS. 4A and 4B depict an embodiment where the analysis period 20 is divided into three knock windows 20a, 20b, and 20c. In FIG. 4A where a knock event occurs, the signal intensity—e.g., such as represented by the knock window integrator, knock ratio, or per-unit knock value—successively decreases between the first knock window 20a and the third knock window 20c. However, where only noise is present and a knock is not present, that relationship is not true, as shown in FIG. 4B.

Figure 5:
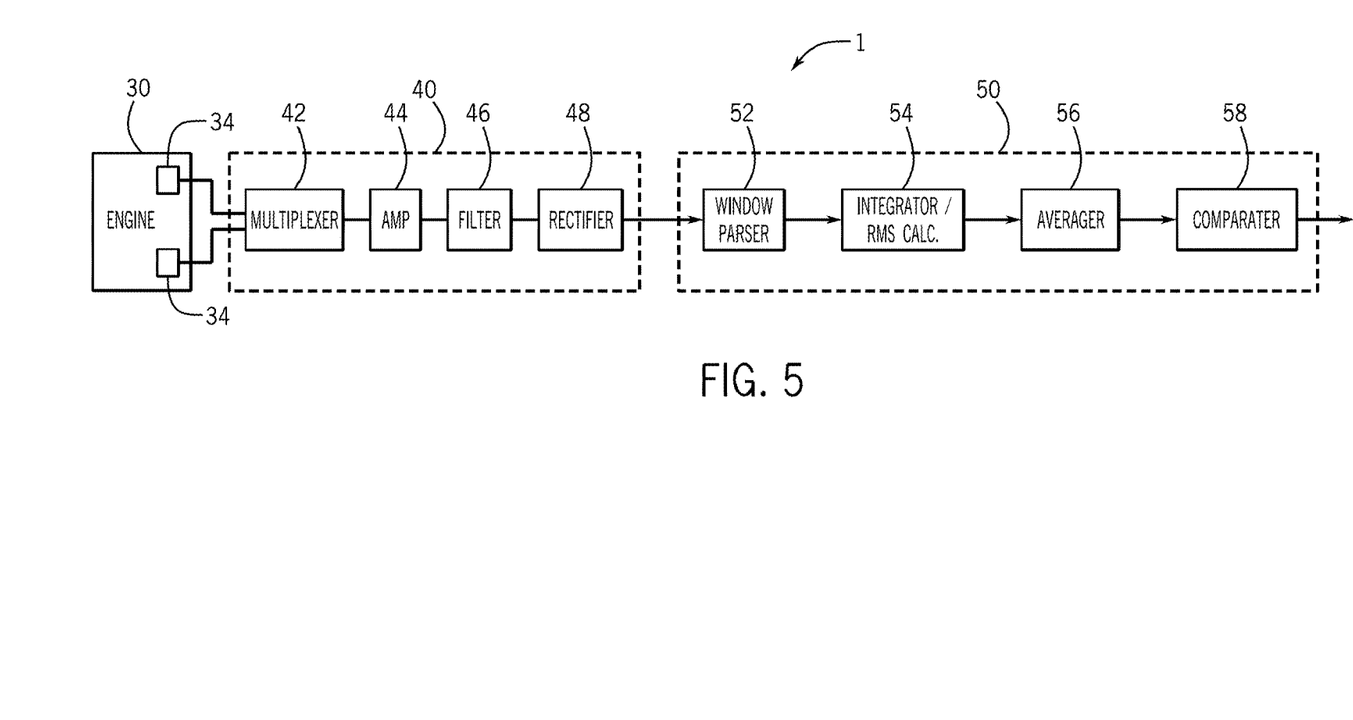
FIG. 5 is a schematic depiction of one embodiment of a knock detection system for a marine propulsion device.

FIG. 5 is a block diagram depicting an example of a knock detection system 1 for a marine propulsion device. In the depicted embodiment, two knock sensors are provided on the engine 30, such as at locations on the engine block that enable uniform measurement of pressure waves emanating from each cylinder to which the respective knock sensor 34 is assigned. The number of knock sensors 34 could vary, and may be a single knock sensor for all cylinders, a knock sensor could be provided for each cylinder, or anywhere in between. It is often desirable to have the sensing for each cylinder be measured from a location that is equidistant for all cylinders. Thus, each knock sensor 34, such as accelerometers, may be positioned to be equidistant from all cylinders to which it is assigned, so that the travel distance for the pressure waves from each monitored cylinder (and thus the time it takes to travel between the cylinder and the sensor) and signal intensity is similar for all cylinders in the engine 30.

The knock sensors 34 may have digital outputs or analog outputs, and thus the knock sensor signal may be a digital signal or an analog signal. The knock sensor signals output by the knock sensors 34 are processed in a signal conditioner, which may be a digital signal processing system or an analog signal processing system, depending on the format of the incoming signals. In embodiments where the signal conditioner is an analog conditioner, the signal conditioner 40 may be provided as part of an analog-to-digital converter. In embodiments where the knock sensor signal is a digital signal, the signal conditioner may be a software instruction set stored and executed on a control module, such as on an engine control module (ECM) or on a dedicated, application-specific control module. In the depicted embodiment, the signal conditioner 40 includes a multiplexer 42. Since the combustion in each of the cylinders occurs sequentially, not simultaneously, the signals from the individual knock sensors may be processed sequentially. Using the multiplexer 42, the knock sensor signals are fed appropriately into the remaining signal processing steps and knock detection steps and can be associated with the respective cylinder. Amplifier 44 is downstream from the multiplexer 42 to amplify the knock sensor signals, as is standard. The signals are then filtered to eliminate frequency ranges which are irrelevant to the knock detection. For example, the filter 46 may be a band pass filter, such as to allow frequencies between eight and twelve kilohertz (kHz) to pass through for analysis. In other embodiments, the band may be wider (such as between eight and eighteen kHz), or may be narrower (such as between eight and ten kHz). The filter may be a double or triple band pass filter, such as to include harmonics in the analyzed signal.

The output of the filter 46 is fed into the rectifier 48 in which the signals are rectified. This rectifier is necessary because the knocking signal may be either positive or negative, and only the absolute intensity is of interest. The conditioned signals are then analyzed in accordance with the above-described method to determine whether a knock as occurred. In the depicted embodiment, the conditioned signals are passed to the control module 50 where instructions are executed to determine whether a knock event has occurred. A window parser instruction set 52 is executed to isolate the analysis period and the respective knock windows as described above. For example, the window parser 52 may include one or more lookup tables which may be accessed based on engine speed and engine load to determine the number of knock windows, a duration of each knock window, and a relevant threshold for each knock window. The parsed knock sensor signal is then processed to determine an intensity value for each window, such as a knock window integrator or a per-unit knock value. Such values are determined by the integrator or RMS calculation instruction set 54. The calculated values from the integrator or RMS calculator are passed to the averager 56, which calculates a long running average for the relevant value. The comparator 58 compares the value from the integrator or RMS calculator 54 to the average value produced by the averager 56. The control module 50 where these instruction sets are performed can be any control module associated with the propulsion device having the engine 30, which may be the ECM associated with the engine 30 or may be a separate, application-specific control module.

The systems and methods described herein may be implemented by one or more computer programs executed by one or more processors, which may all operate as part of a single control module. The computer programs include processor executable instructions that are stored on a non-transitory tangible computer readable medium. The computer programs may also include stored data. Non-limiting examples of the non-transitory tangible computer readable medium are nonvolatile memory, magnetic storage, and optical storage.

As used herein, the term module may refer to, be part of, or include an application-specific integrated circuit (ASIC), an electronic circuit, a combinational logic circuit, a field programmable gate array (FPGA), a processor (shared, dedicated, or group) that executes code, or other suitable components that provide the described functionality, or a combination of some or all of the above, such as in a system-on-chip. The term module may include memory (shared, dedicated, or group) that stores code executed by the processor. The term code, as used herein, may include software, firmware, and/or microcode, and may refer to programs, routines, functions, classes, and/or objects. The term shared, as used above, means that some or all code from multiple modules may be executed using a single (shared) processor. In addition, some or all code to be executed by multiple different processors may be stored by a single (shared) memory. The term group, as used above, means that some or all code comprising part of a single module may be executed using a group of processors. Likewise, some or all code comprising a single module may be stored using a group of memories.

Figure 6:
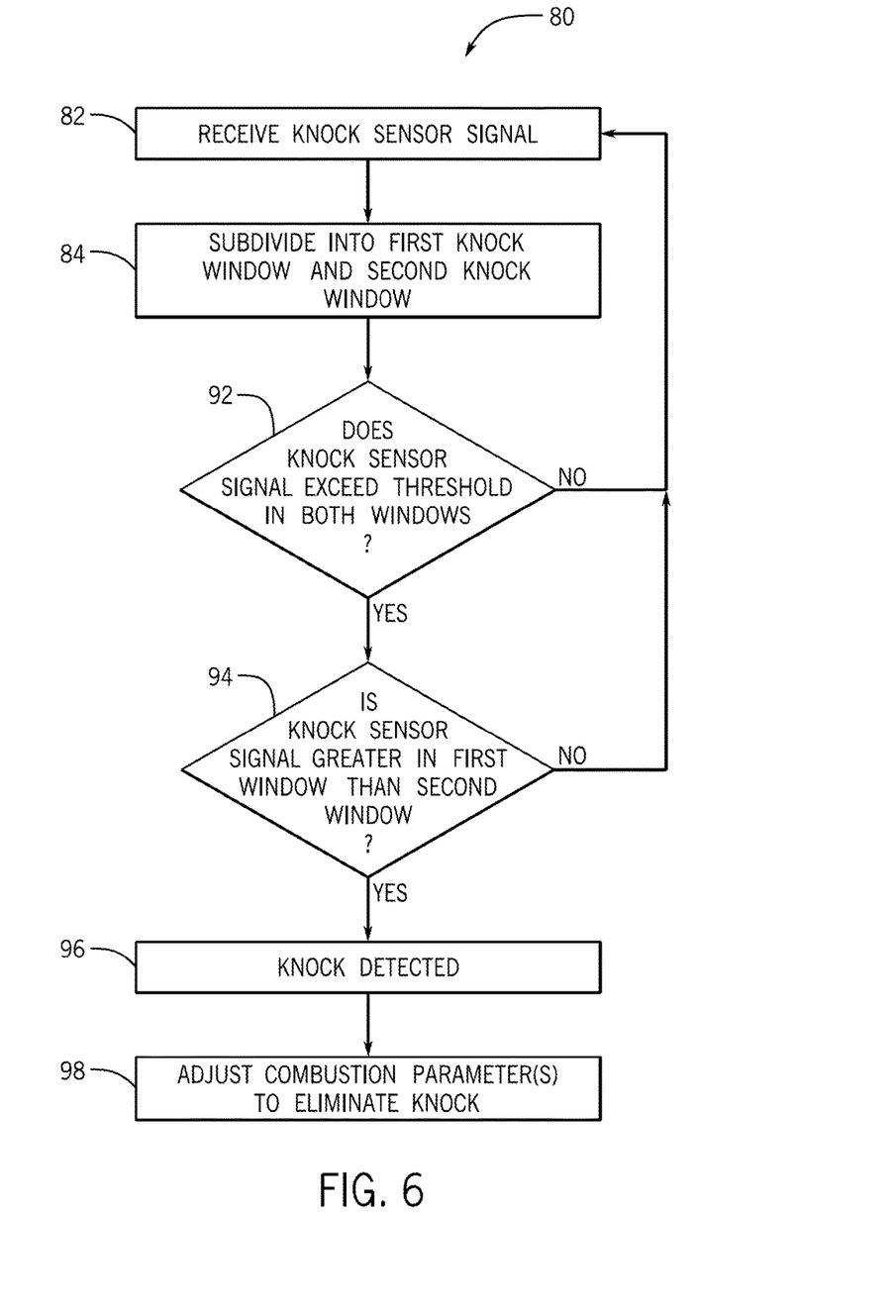
FIGS. 6-8 depict embodiments of methods for detecting knocking and controlling an internal combustion engine accordingly.
Figure 7:
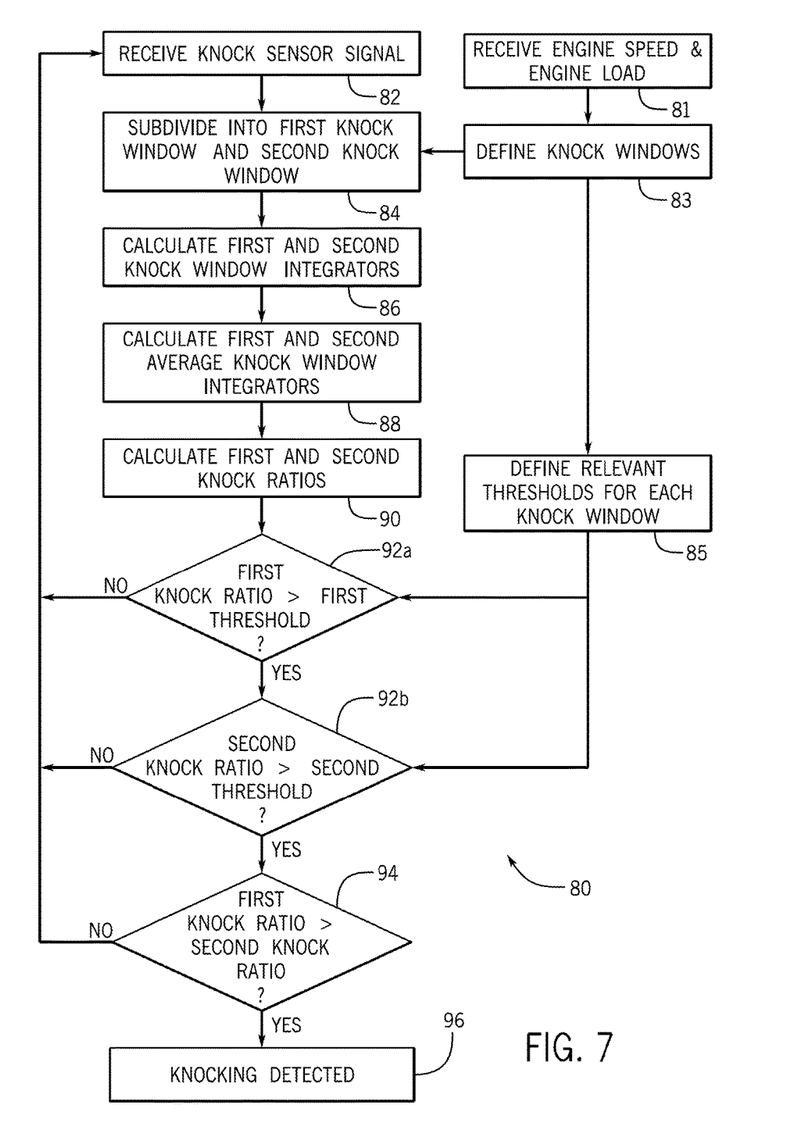
Figure 8:
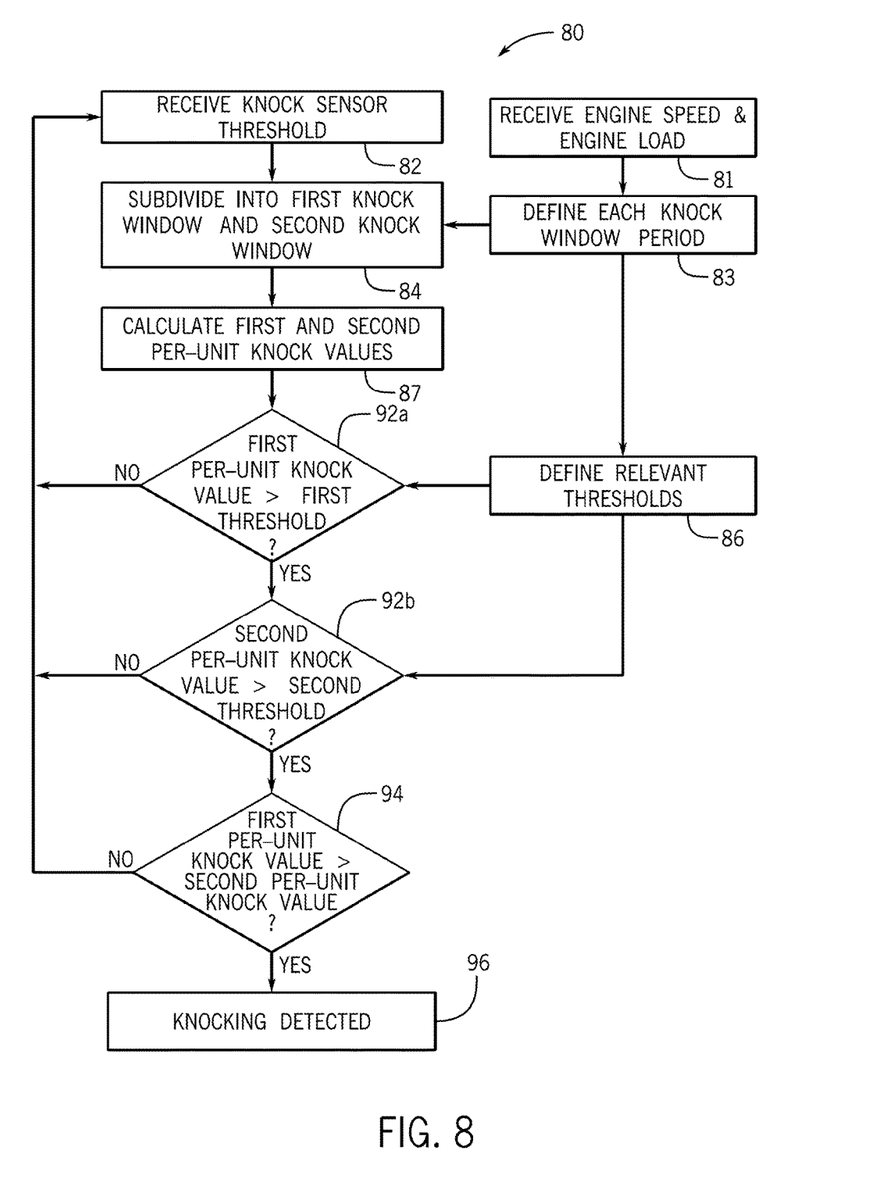

FIGS. 6-8 depict exemplary methods 80 of detecting knocking and controlling an internal combustion engine 30 of a marine propulsion device accordingly. In FIG. 6, a knock sensor signal is received at step 82 and is subdivided at step 84 into a first knock window and a second knock window. Instructions are then executed at step 92 to determine whether the knock sensor signal intensity exceeds a relevant threshold in each of the knock windows. If not, then the inquiry is over and no knock is detected. If the threshold in each window is exceeded, then step 94 is executed to determine whether the knock sensor signal intensity is greater in the first knock window than in the second knock window. If not, then the inquiry is over and no knock is detected. If step 94 is true, then a knock is detected at step 96 and one or more of the combustion parameters are adjusted at step 98 to eliminate the knock. As will be known to a person having ordinary skill in the art, the combustion parameters include spark timing, spark intensity, and fuel injection timing, duration, and flow rate, intake air flow rate, intake and exhaust camshaft timing. For example, the spark timing may be retarded to reduce knock. Alternatively or additionally, the amount of fuel injected into the cylinder may be changed. Since increases in fueling can have a cooling effect on the ignition event, knock can be reduced by increasing the amount of fuel injected by the fuel injector in the knocking cylinder. Alternatively or additionally, the air intake magnitude may be adjusted, such as to reduce the amount of air intake into the cylinder.

FIG. 7 depicts another embodiment of a method 80 of detecting knocking. An engine speed and an engine load are received at step 81 and each knock window is defined at step 83, such as the number of knock windows and the period for each knock window. The relevant thresholds are defined for each knock window at step 85. For example, steps 83 and 85 may be performed by accessing the relevant information provided on one or more lookup tables based on engine speed and engine load.

Simultaneously or subsequently, the knock sensor signal is received at step 82 and the knock windows are defined at step 83. Step 84 subdivides the knock sensor signal into the defined knock windows, which in the depicted embodiment are exemplified as the first knock window and the second knock window. Knock window integrators are then calculated for each knock window at step 86, and average knock window integrators are calculated for each knock window at step 88. For example, the average knock window integrator may be an exponentially weighted moving average or a first order filter of the knock window integrators. Knock ratios are calculated for each knock window at step 90, such as the ratio of the knock window integrator over the average knock window integrator for each knock window as described above. The first knock ratio is compared to a first threshold at step 92*a*, wherein the first threshold is defined at step 85 based on the knock window definitions established based on the engine speed and engine load. Likewise, the second knock ratio is compared to the second threshold at step 92*b*. If either of the thresholds are not exceeded, then the inquiry is ended and no knock is detected. If both thresholds are exceeded then step 94 is executed to determine whether the first knock ratio is greater than the second knock ratio. If not, then no knock is detected. If so, then knocking is detected.

FIG. 8 depicts another embodiment of a method 80 of detecting knocking in a marine propulsion device. Steps 81-84 are executed as described above. Per-unit knock values are then calculated at step 87 for each knock window, such as the rms value for the filtered and rectified knock sensor signal 10, 14 in each window. At step 92*a* the first per-unit knock value is compared to the first threshold, and the second per-unit knock value is compared to the second threshold at step 92*b*. If both thresholds are exceeded then step 94 is executed to determine whether the first per-unit knock value is greater than the second per-unit knock value. If so, then knocking is detected at step 96.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling an internal combustion engine of a marine propulsion device, the method comprising:
    receiving a knock sensor signal over an analysis period in a combustion cycle of the internal combustion engine;
    subdividing the analysis period into at least a first knock window and a second knock window;
    determining that the knock sensor signal exceeds a threshold in each of the first knock window and in the second knock window;
    determining that the knock sensor signal intensity is greater in the first knock window than in the second knock window; and
    adjusting at least one combustion parameter for the internal combustion engine to eliminate knocking.

2. The method of claim 1, further comprising:
    integrating the knock sensor signal in the first knock window to determine a first knock window integrator; and
    integrating the knock sensor signal in the second knock window to determine a second knock window integrator.

3. The method of claim 2, wherein the step of determining that the knock sensor signal intensity is greater in the first knock window than in the second knock window includes determining that the first integrated value is greater than the second integrated value.

4. The method of claim 2, further comprising:
    calculating a first average knock window integrator as the exponentially weighted moving average of the first knock window integrator and previous first knock window integrators for previous combustion cycles;
    calculating a second average knock window integrator as the exponentially weighted moving average of the second knock window integrator and previous second knock window integrators for the previous combustion cycles;
    calculating a first knock ratio for the first knock window based on the first knock window integrator and the first average knock window integrator;
    calculating a second knock ratio for the second knock window based on the second knock window integrator and the second average knock window integrator;
    wherein the step of determining that the knock sensor signal exceeds the threshold in each of the first knock window and in the second knock window includes:
        determining that the first knock ratio exceeds a first knock ratio threshold; and
        determining that the second knock ratio exceeds a second knock ratio threshold.

5. The method of claim 4, wherein the step of determining that the knock sensor signal intensity is greater in the first window than in the second window includes determining that the first integrated value is greater than the second integrated value, and/or determining that the first knock ratio is greater than the second knock ratio.

6. The method of claim 1, wherein the first knock window and the second knock window are each defined as one of a time range or a crank angle range.

7. The method of claim 6, further comprising:
    determining a first per-unit knock value for the knock sensor signal in the first knock window; and
    determining a second per-unit knock value for the knock sensor signal in the second knock window.

8. The method of claim 7, wherein the step of determining that the knock sensor signal exceeds the threshold in each of the first knock window and in the second knock window includes:
    determining that the first per-unit knock value exceeds a first per-unit knock threshold; and
    determining that the second per-unit knock value exceeds a second per-unit knock threshold.

9. The method of claim 7, wherein the step of determining that the knock sensor signal intensity is greater in the first window than in the second window includes determining that the first per-unit knock value is greater than the second per-unit knock value.

10. The method of claim 9, wherein the first knock window has a longer period than the second knock window.

11. The method of claim 1, wherein a period of the first knock window and a period of the second knock window are each defined based on at least one of engine load and engine speed.

12. The method of claim 1, including subdividing the analysis period into at least three knock windows, and wherein the step of determining that the knock sensor signal intensity is greater in the first window than in the second window includes determining that the knock sensor signal intensity in one of the at least three knock windows is greater than the knock sensor signal intensity in a subsequent one of the at least three knock windows.

13. A method for detecting knocking in a marine propulsion device, the method comprising:
   receiving a knock sensor signal over an analysis period in a combustion cycle of an internal combustion engine;
   subdividing the analysis period into at least a first knock window and a second knock window;
   determining a first per-unit knock value for the knock sensor signal in the first knock window;
   determining a second per-unit knock value for the knock sensor signal in the second knock window;
   detecting knocking based on a comparison between the first per-unit knock value and the second per-unit knock value; and
   adjusting at least one combustion parameter for the internal combustion engine to reduce knocking.

14. The method of claim 13, wherein the step of detecting knocking based on a comparison between the first per-unit knock value and the second per-unit knock value includes determining that the first per-unit knock value is greater than the second per-unit knock value.

15. The method of claim 13, wherein the step of detecting knocking further includes:
   determining that the first per-unit knock value exceeds a first per-unit knock threshold; and
   determining that the second per-unit knock value exceeds a second per-unit knock threshold.

16. The method of claim 13, wherein the first knock window and the second knock window are each defined based on at least one of engine load and engine speed, and wherein the first knock window has a smaller crank angle range or a smaller time range that the second knock window.

17. The method of claim 16, wherein the number of knock windows defined varies based on at least one of engine load and engine speed.

18. A knock detection system for a marine propulsion device, the knock detection system comprising:
   at least one knock sensor producing a knock sensor signal over an analysis period in a combustion cycle of an internal combustion engine;
   a control module configured to:
      receive the knock sensor signal;
      subdivide the analysis period into at least a first knock window and a second knock window;
      determine that the knock sensor signal in each of the first knock window and the second knock window exceeds at least one threshold;
      determine that knocking is occurring when the knock sensor signal has a greater intensity in the first knock window than in the second knock window; and
      adjust at least one combustion parameter for the internal combustion engine to eliminate knocking.

19. The system of claim 18, wherein the control module is further configured to:
   determine a first per-unit knock value for the knock sensor signal in the first knock window;
   determine a second per-unit knock value for the knock sensor signal in the second knock window; and
   determine that knocking is occurring where the first per-unit knock value is greater than the second per-unit knock value.

20. The system of claim 18, wherein the control module is further configured to define the first knock window and the second knock window based on at least one of engine load and engine speed.

* * * * *